Feb. 6, 1951  D. M. POTTER  2,540,346
COAXIAL COUPLING
Filed Nov. 14, 1945
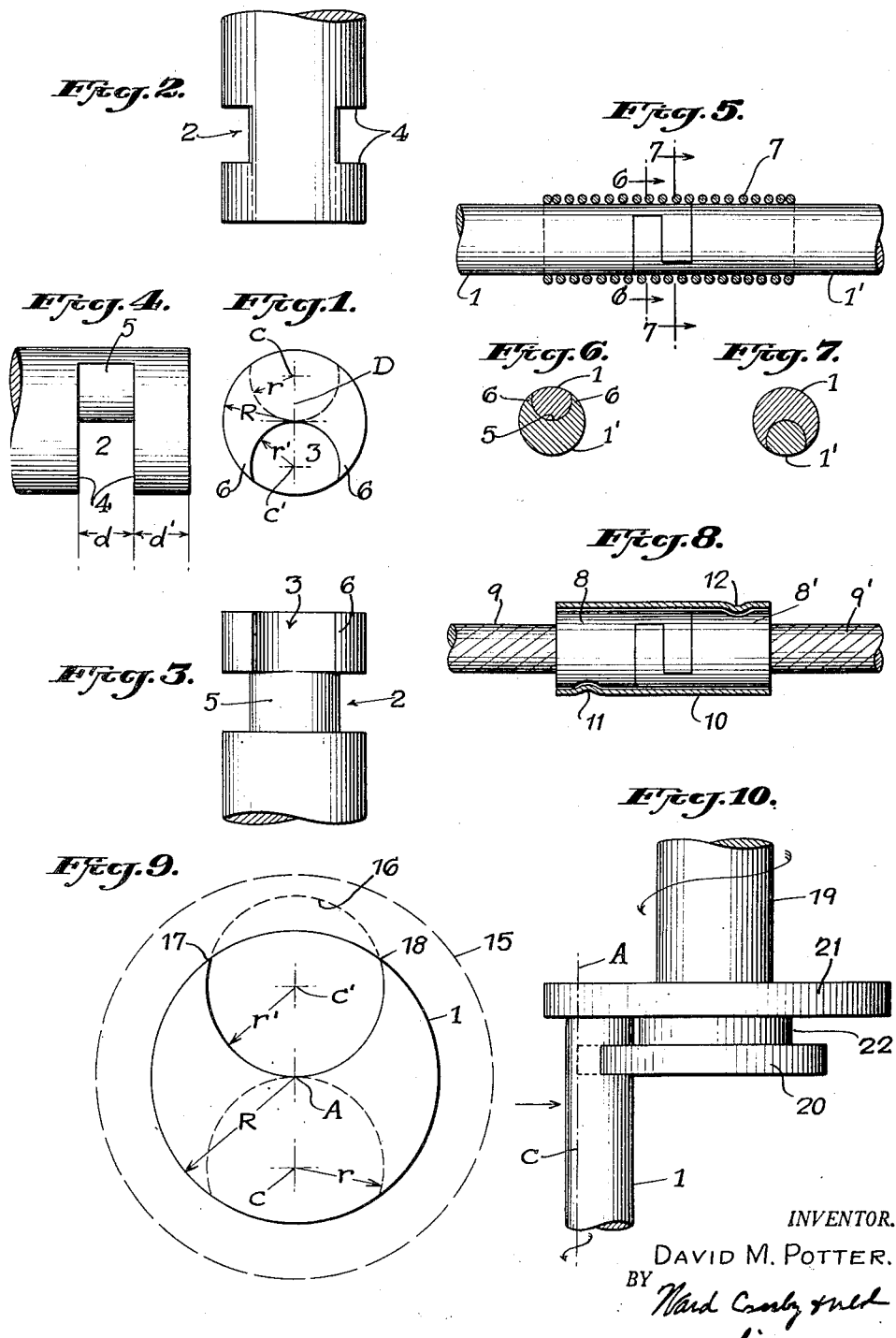
INVENTOR.
DAVID M. POTTER.
BY
his ATTORNEYS.

Patented Feb. 6, 1951

2,540,346

UNITED STATES PATENT OFFICE 2,540,346

COAXIAL COUPLING

David M. Potter, Plainfield, N. J.

Application November 14, 1945, Serial No. 628,541

7 Claims. (Cl. 287—104)

This invention relates to a coaxial coupling used to connect adjacent ends of rods, shafts, tubes, etc. in axial alignment; and method of making the same. When applied to certain uses, the device is known as a disconnect. The coupling is useful in connection both with relatively rigid shaft members and flexible shafts or cable.

An object of the invention is to provide an improved coupling which is adapted to transmit axial, torsional and bending forces between the interconnected elements.

Another object of the invention is to provide a coupling in which the interlocking ends of the two component coupling elements or members are identical, to thereby facilitate manufacture and assembly of the parts in use.

Another object of the invention is to provide a coupling adapted for economy of manufacture.

Another object of the invention is to provide a method of making said coupling elements.

Further objects and advantages of the invention will more fully appear from the following description taken in connection with the accompanying drawings illustrating by way of example a preferred embodiment of the device and a preferred method of making the same.

Referring to the drawings:

Figs. 1, 2, 3 and 4 are respectively an end elevation, a top plan view, a bottom plan view and a side elevation of the end of a coupling member embodying the invention, Fig. 5 is a side elevation showing two of said coupling members in interlocking operative engagement with a sleeve (partly in section) surrounding the two ends to assure neutral alignment, Figs. 6 and 7 are sections taken respectively at 6—6 and 7—7 of Fig. 5, Fig. 8 is a side elevational view, partly in section, showing a pair of said coupling ends in operative engagement serving to connect two lengths of flexible cable, Fig. 9 is a diagram showing certain steps in connection with the method of making said coupling members, and Fig. 10 is a somewhat diagrammatic view showing further details in the operation of forming the ends of said members.

Since my invention contemplates as a salient feature thereof a coupling device in which the coupling ends are identical, one of these members will first be described and thereafter the interlocking relationship will be more fully described.

Referring more particularly to Figs. 1-4 of the drawings: one of the coupling members or elements is designated as 1 and is provided with a transverse notch designated as 2, and a longitudinal notch designated as 3. The transverse notch 2 provides side walls such as 4 which are normal to the longitudinal axis of the member 1, which is preferably its axis of rotation in use and which will be designated A. The walls 4 are spaced apart an axial distance, designated $d$, which is substantially equal to the distance from the notch to the end of the member, designated $d'$; the distance $d$ being very slightly greater than the distance $d'$ to provide for a tight interfitting engagement of the parts, as will be more fully explained hereafter. The bottom of the notch is designated as 5 and is of convex form, preferably having a contour defined by a cylinder whose axis C is parallel to the axis A and eccentric thereto, and a portion of whose surface substantially coincides with said axis A. The radius $r$ of said cylinder is less than the radius R of the member, which radius R defines the member in its preferred circular form, or if the member be polygonal in cross section then the circle whose radius is R will represent the inscribed circle of said polygon. The radius $r$ is of such size that the circumference which it defines will be intersected by the circumference defined by the radius R so that the cylindrical surface 5, defined by $r$, will extend at least 180° and preferably such an extent that the center C will be spaced inwardly from a line joining the points of intersection of the arcs defined by the radii R and $r$.

The longitudinal notch 3 extends from the end of the member 1 to the notch 2 and this notch is concave transversely and is defined by a cylinder whose axis C' is disposed diametrically opposite to the center C and which is eccentric to the axis A an amount substantially equal to the eccentricity of the axis C; and whose radius $r'$ is substantially equal to the radius $r$. It will thus be seen that the concave recess 3 is complementary to the convex surface 5. The radius $r'$ is only sufficiently larger than the radius $r$ to provide for interfitting clearance, for the purposes to be more fully described following. It will thus be seen that the convex surface 5 and the concave recess 3 are oppositely disposed and coincide with the axis A.

It will be seen from the foregoing that the longitudinal notch 3 and the transverse notch 2 jointly provide a yoke whose jaws 6 are spaced apart transversely and which extend in an axial direction the distance $d'$. Due to the eccentricity and diameter of the arc defining the interior of this yoke, the transverse spacing of these jaws at their outer edges is less than the maximum diameter of the convex portion 5 forming the bottom of the notch 2. These relative dimensions are such that a snap-action is provided so that when the jaws of one member are inserted in the transverse notch of the other member, the jaws 6 will snap over the complementary surface 5 of the other member; whereby each member will have a snap-action with respect to the other member when the two parts are in interlocking engagement. This is the preferred form, but it will be understood that so long as the jaws 6 do not terminate inwardly of the center C', they will still provide for the transmission of torque between the members without any tendency for the members to separate in a radial direction from the axis A. It is further understood that the complementary transverse contours of the bottoms of the respective notches 2 and 3 may take other forms than cylindrical, and although this is considered desirable and highly preferable from the standpoint of simplicity in manufacture and strength, nevertheless it is contemplated that these complementary contours may assume other shapes which may be provided by forging or other methods than the preferred method hereinafter to be described. In its broader aspects the invention contemplates interengaging coupling members each of which is provided with portions interfitting in straddling engagement transversely of the cooperating part of the other member, and with engaging portions in straddling engagement axially of a cooperating portion of the other member, to thereby transmit axial, torsional and bending forces between the said members.

Referring more particularly to Figs. 5–7: two identical coupling members are designated 1 and 1' and are preferably surrounded by a suitable sleeve-like member to hold the parts in neutral alignment. In the present embodiment this sleeve takes the form of the helical spring 7 whose normal internal diameter is slightly less than the external diameter of the coupling members 1 and 1', this spring sleeve being more particularly described and claimed in my Patent No. 2,328,294 for Connector issued August 31, 1943. It will be seen from Figs. 6 and 7 that oppositely disposed portions such as 6 of each of the coupling members is in transverse straddling engagement with a cooperating portion of the other of said members; and it will be seen from Fig. 5 that each of said members is in longitudinal straddling engagement with a cooperating portion of the other member.

In Fig. 8 I have shown the invention applied to interconnecting flexible cable members or shafts. The coupling members are designated 8—8' and are suitably permanently attached to the flexible cable members or shafts such as 9—9' (as by swaging) and the coupling members are held in neutral alignment by a suitable sleeve 10 which is held in axial position by suitable means such as the slotted and stamped-out portions 11—12 of the sleeve providing slight yieldable inwardly extending portions adapted for engagement in respective cooperating recesses formed in the exterior of the coupling members 8—8' respectively. It is understood that such sleeves serve the purpose of holding the parts in neutral alignment but do not carry any forces transmitted between the connected ends, except in the possible event that the two shafts might be moved out of alignment in a direction normal to their common axis and in radial alignment with the center of the engaging jaws such as 6, and provided further that such force is of sufficient degree to overcome the snap action above referred to, or in the event that this feature of the invention be not utilized. In other words, it will be understood that the normal forces axially, torsionally and in bending are taken care of by the coupling members themselves and the sleeve is intended primarily to hold the parts in neutral position of alignment and to prevent accidental displacement of the members one with respect to the other in the event that such displacing force happens to be exerted at the critical position above defined.

*Method*

Although the coupling members above described are adapted to be made in several ways I have devised the following method which has been found well suited to economy in the manufacture of high quality products.

Referring more particularly to Fig. 9: a piece of bar stock is indicated in end view by dash lines as 15, and while this may be of any cross-sectional form it is preferred that it be symmetrical about its central axis, and to facilitate the following operations it is preferred that this be circular as illustrated. A hole 16 is drilled in an axial direction about the center line C', eccentrically disposed as above described, for a depth sufficient to form the longitudinal notch 3 above referred to and of such diameter that when finished the hole 16 has the radius r' above referred to. This hole is preferably reamed to provide a finished surface of a desired radius. The stock 15 is then reduced in diameter to the desired diameter of the member 1, as indicated by solid lines, and the circumference of the member 1 intersects the periphery of the holes 16 at 17—18, which, as above explained, are preferably spaced outwardly beyond the center of the hole C'. The piece is then supported for transverse and rotatable motion (by suitable means not shown) in the directions indicated in Fig. 10, the axis about which the member is to be rotated being the axis C hereinbefore referred to as the center of the convex bottom of the transverse slot. The piece is thus adapted to be fed to suitable cutting means rotatably mounted on a shaft 19, said cutting tool comprising a cutting wheel 20 for cutting the transverse notch and a cutting wheel 21 for finishing the end of said member, and the wheels 20 and 21 being separated by a spacer 22 of substantially the same width as the width of the cutting wheel 20, so that the width of the transverse notch will be substantially equal to the distance from the notch to the finished end of the member 1, to provide the distances d and d' of the order previously referred to. Transverse feeding of the member 1 serves to cut the outer portion of the transverse slot above referred to and rotational feeding provides the convex surface on the bottom of said slot having the radius r, as above described. The clearance between the interfitting parts is only sufficient to permit ready assembly of the parts in use. For example, in a coupling having the shaft diameter of the order of ¼'', the width d of the transverse slot need only be one or two thousandths greater than the distance of the slot from the finished shaft end; and the diameter of the hole 16 when finished need only be of the order of one or two thousandths greater than the finished diameter of the corresponding portion of the other shaft defined by the radius $r$. The width of the transverse notch and the corresponding distance between the slot and the end of the shaft may be determined by the strength of the material, the load to be carried, etc.; while the radii $r$ and $r'$ are determined by the diameter of the shaft coupling, all of which will be readily understood by those skilled in the art after understanding the invention.

If preferred the coupling elements may be formed in the rough as by coating or forging and thereafter finished to the desired size.

Having thus described my invention with particularity with reference to preferred forms of the device and method of making the same, and having pointed out certain modifications, it will be obvious to those skilled in the art, after understanding my invention, that other changes and modifications may be made therein without departing from the spirit and scope of the invention, and I aim in the appended claims to cover such changes and modifications as are within the scope of the invention.

What I claim is:

1. A member adapted for use as one of a pair of coaxial coupling members having identical engageable portions, the engageable portions of said member being defined by a transverse notch spaced from an end of said member a distance substantially equal to the width of said notch and a longitudinal notch extending from the end of said member to said transverse notch, the transverse notch having parallel walls spaced axially and the longitudinal notch having side walls spaced laterally and disposed substantially parallel to said axis, said transverse notch also providing engageable portions disposed on opposite sides of the axis of rotation and which are complementary to but disposed 180° from the side walls of said longitudinal notch.

2. A member adapted for use as one of a pair of coaxial coupling members having identical engageable portions, the engageable portions of said member being defined by a transverse notch spaced from an end of said member a distance substantially equal to the width of said notch and a longitudinal notch extending from the end of said member to said transverse notch, the transverse notch having parallel walls spaced axially and disposed substantially normal to said axis and the longitudinal notch having side walls spaced laterally and disposed substantially parallel to said axis, said transverse notch also providing engageable portions disposed on opposite sides of the axis of rotation and which are complementary to but disposed 180° from the side walls of said longitudinal notch.

3. A member adapted for use as one of a pair of coaxial coupling members having identical engageable portions, said member having a notch whose side walls are parallel and extend in depth inwardly in a direction transverse to the axis of rotation of said member and are parallel to the end of said member, one of said walls being spaced from the end of said member an axial distance slightly less than the width of said notch, said notch terminating inwardly in a convex surface of revolution generated about an axis parallel and eccentric to the axis of rotation of said member and said surface at the center of said notch being substantially tangent to a plane passing through said axis of rotation of said member and having a radius less than the distance from the center of a cross-section of said member to a point on the periphery of said cross-section of said member, and a portion of said member intermediate its ends and said notch having a recess therein providing a yoke diametrically opposed to said notch and having an interior contour complementary to and of slightly larger contour than the contour of the bottom of said notch.

4. A member adapted for use as one of a pair of coaxial coupling members having identical engageable portions, said member having a notch whose side walls extend in depth inwardly in a direction normal to the axis of rotation of said member and are parallel to the end of said member, one of said walls being spaced from the end of said member an axial distance slightly less than the width of said notch, said notch terminating inwardly in a convex cylindrical surface generated about an axis parallel and eccentric to the axis of rotation of said member and said surface being substantially tangent to a plane passing through said axis of rotation of said member and having a radius less than the distance from the center of a cross-section of said member to a point on the periphery of said cross-section of said member, and a portion of said member intermediate its end and said notch having a recess therein providing a yoke diametrically opposed to said notch and having an interior contour complementary to and of slightly larger contour than the contour of the bottom of said notch.

5. A member adapted for use as one of a pair of coaxial coupling members having identical engageable portions, said member having a notch whose side walls extend in depth inwardly in a direction normal to the axis of rotation of said member and are parallel to the end of said member, one of said walls being spaced from the end of said member an axial distance substantially equal to the width of said notch, said notch terminating inwardly in a convex cylindrical surface generated about an axis parallel but eccentric to the axis of rotation of said member, said convex surface being substantially tangent to a plane passing through said axis of rotation of said member and having a radius such that said surface meets the periphery of a cross-section of said member along lines subtending at least 180° of the circumference of said convex surface, and a portion of said member intermediate its end and said notch having a recess therein providing a yoke diametrically opposed to said notch and having a concave interior contour complementary to and slightly larger than the convex contour of the bottom of said notch.

6. A coaxial coupling comprising interlocking members provided with identical engageable portions, each of said members having a transverse notch spaced from the end an axial distance substantially equal to its width and extending in a direction normal to the axis of the member, the bottom of said notch at its radial center coinciding substantially with said axis and said notch extending outwardly and downwardly on respective opposite sides of said radial center to thereby provide a reduced section of said member disposed entirely on one side of the axis of said member with bifurcations of said notch disposed laterally on opposite sides thereof, and laterally spaced axially extending jaws provided on the portion between said notch and end, said jaws having an internal transverse configuration of the same contour as said configuration of the bottom of said transverse notch, whereby the jaws of one member are adapted for interfitting engagement in the transverse notch of the other member with the axially spaced ends of said jaws abutting the corresponding faces of the notch to transmit axial and transverse forces between said members and the laterally spaced faces of the jaws abutting the corresponding opposite sides of said reduced portion to transmit torsional forces between said members.

7. A coaxial coupling comprising interlocking members provided with identical engageable portions, each of said members having a transverse notch spaced from the end an axial distance substantially equal to its width and extending in a direction normal to the axis of the member and whose bottom is defined by an arcuate surface approximately tangent to a line passing through the diameter of said shaft and laterally spaced axially extending jaws provided on the portion between said notch and end, said jaws having an internal concave configuration of the same contour as said convex configuration of the bottom of said transverse notch, whereby the jaws of one member are adapted for interfitting engagement in the transverse notch of the other member providing engageable portions adapted to transmit axial, torsional and transverse bending forces between said members.

DAVID M. POTTER.

REFERENCES CITED

The following references are of record in the file of this patent:

UNITED STATES PATENTS

| Number | Name | Date |
|---|---|---|
| 238,977 | Haldeman | Mar. 15, 1881 |
| 1,610,977 | Scott | Dec. 14, 1926 |
| 2,276,571 | Grypma | Mar. 17, 1942 |
| 2,294,091 | Mahr | Aug. 25, 1942 |
| 2,296,993 | Gerry | Sept. 29, 1942 |
| 2,328,294 | Potter | Aug. 31, 1943 |

FOREIGN PATENTS

| Number | Country | Date |
|---|---|---|
| 22,337 | Great Britain | A. D. 1912 |

Certificate of Correction

Patent No. 2,540,346 February 6, 1951

DAVID M. POTTER

It is hereby certified that error appears in the printed specification of the above numbered patent requiring correction as follows:

Column 8, line 14, list of references cited, for the patent number "238,977" read *238,895*;

and that the said Letters Patent should be read as corrected above, so that the same may conform to the record of the case in the Patent Office.

Signed and sealed this 17th day of April, A. D. 1951.

[SEAL]

THOMAS F. MURPHY,
*Assistant Commissioner of Patents.*